April 15, 1924.  L. J. CARLOZZI  1,490,659
DEVICE FOR USE IN DRAWING OBJECTS
Filed Nov. 22, 1923  4 Sheets-Sheet 2
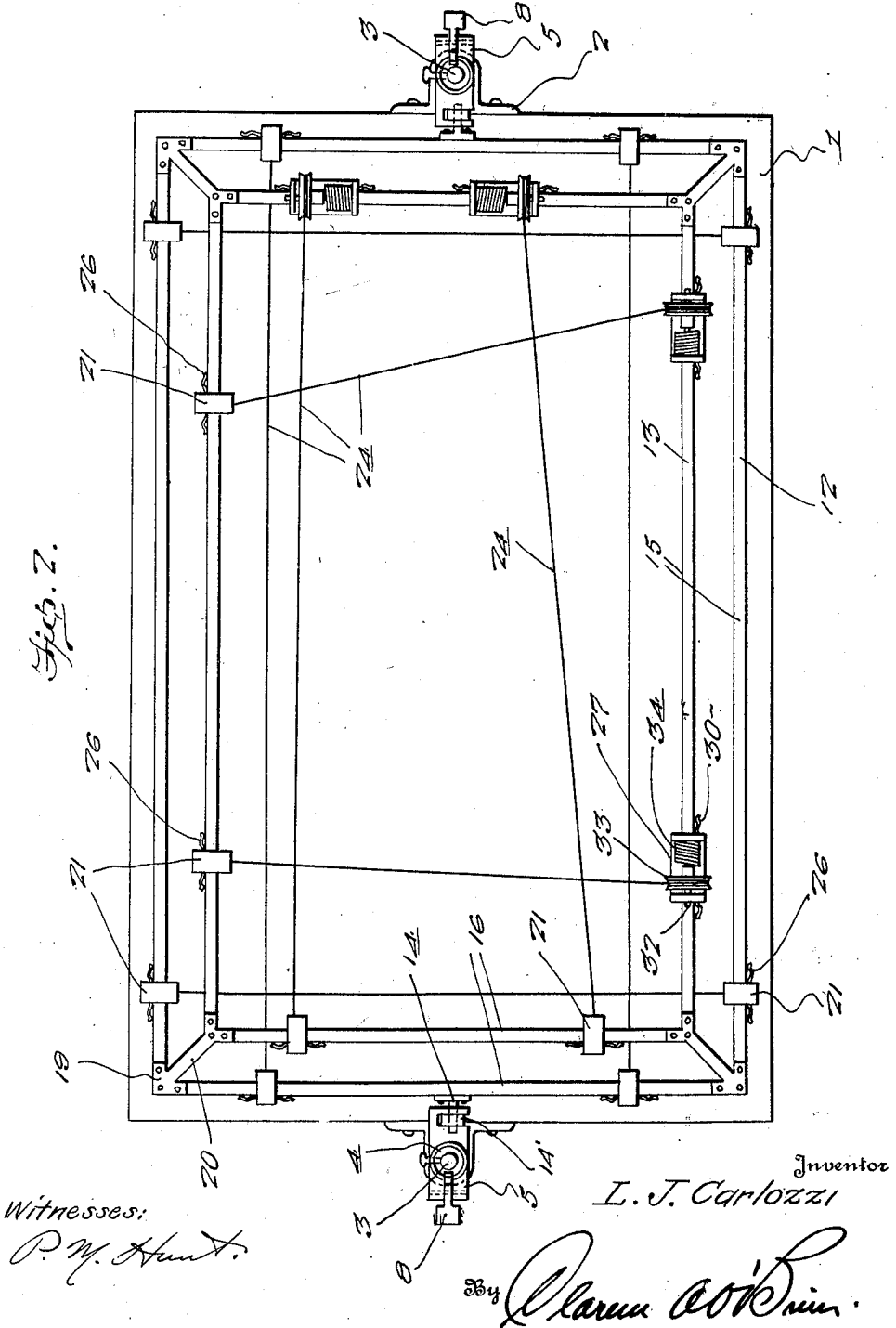

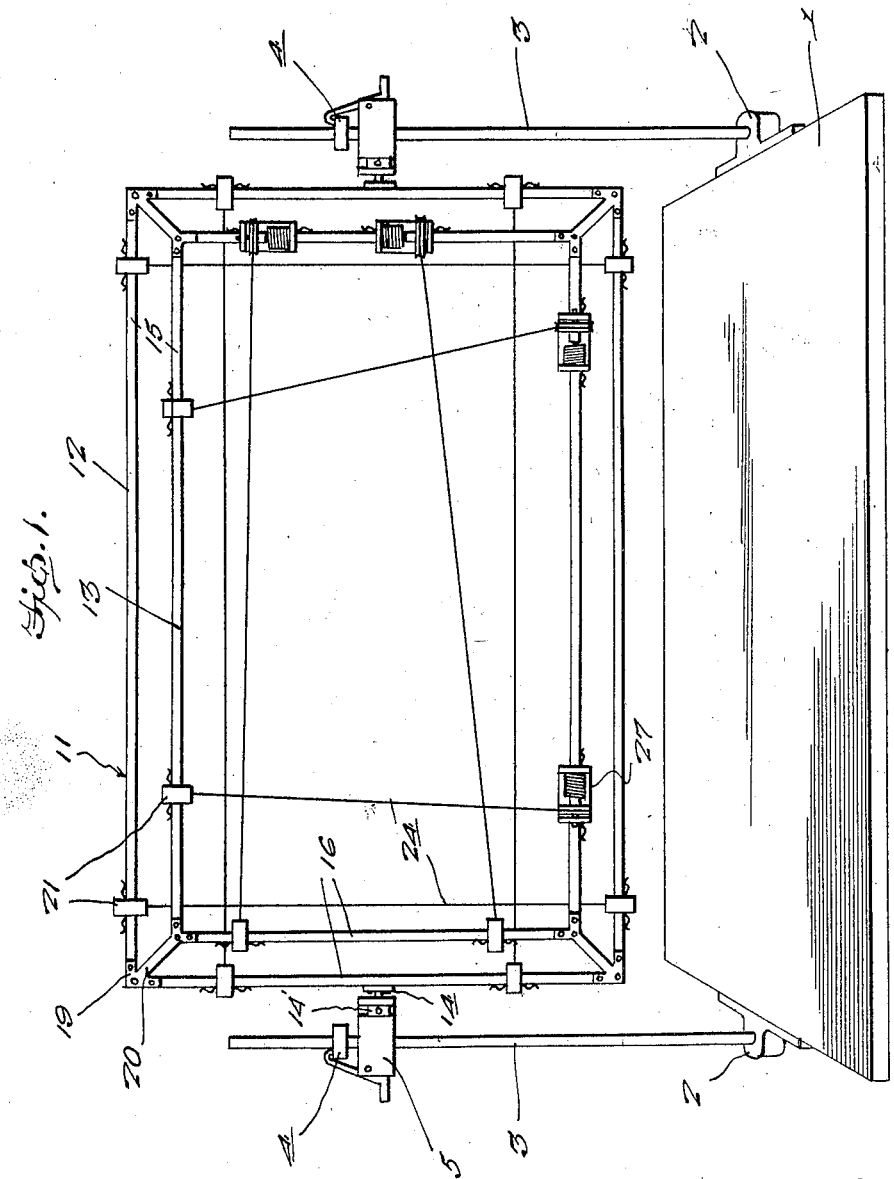

April 15, 1924.
L. J. CARLOZZI
1,490,659
DEVICE FOR USE IN DRAWING OBJECTS
Filed Nov. 22, 1923     4 Sheets-Sheet 3
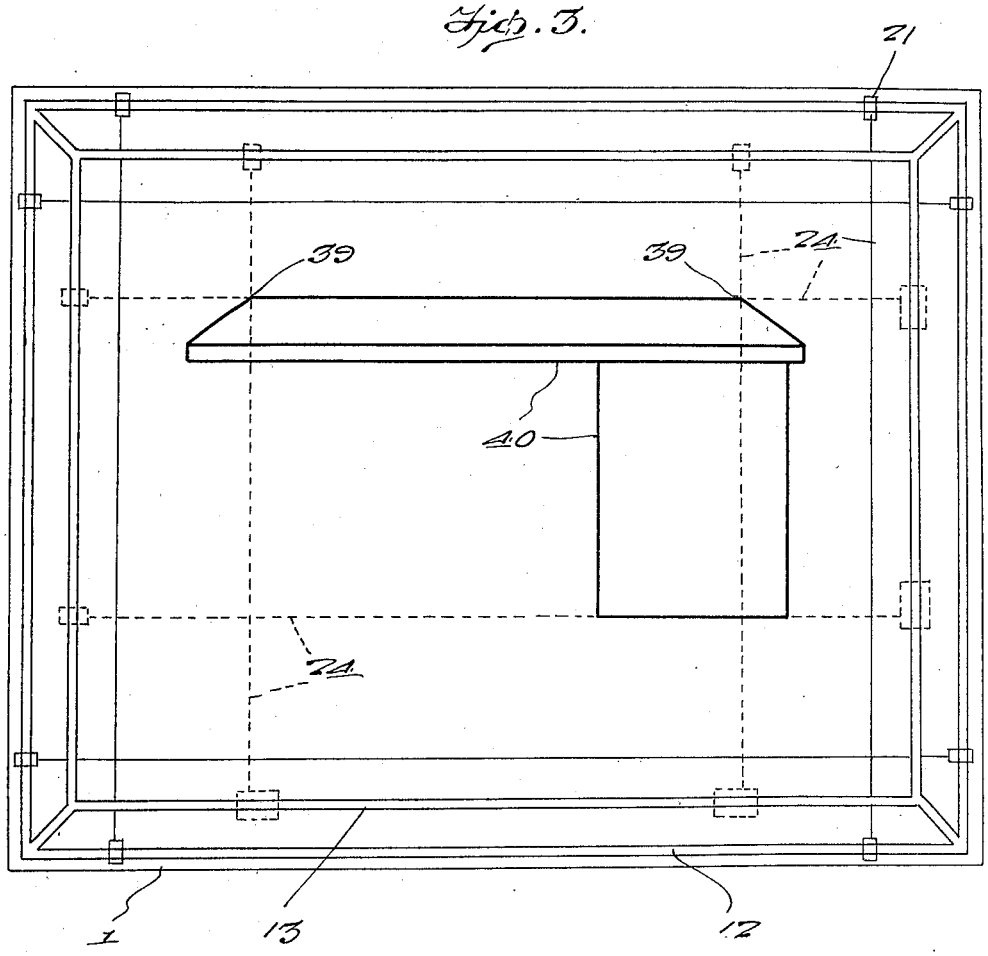
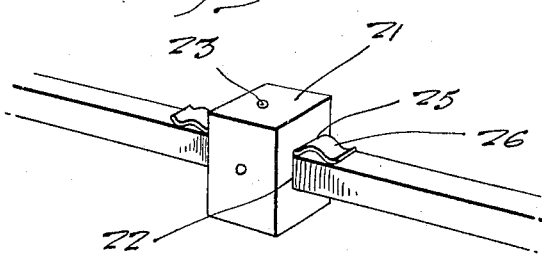
Witnesses:
Inventor
L. J. Carlozzi
By
Attorney

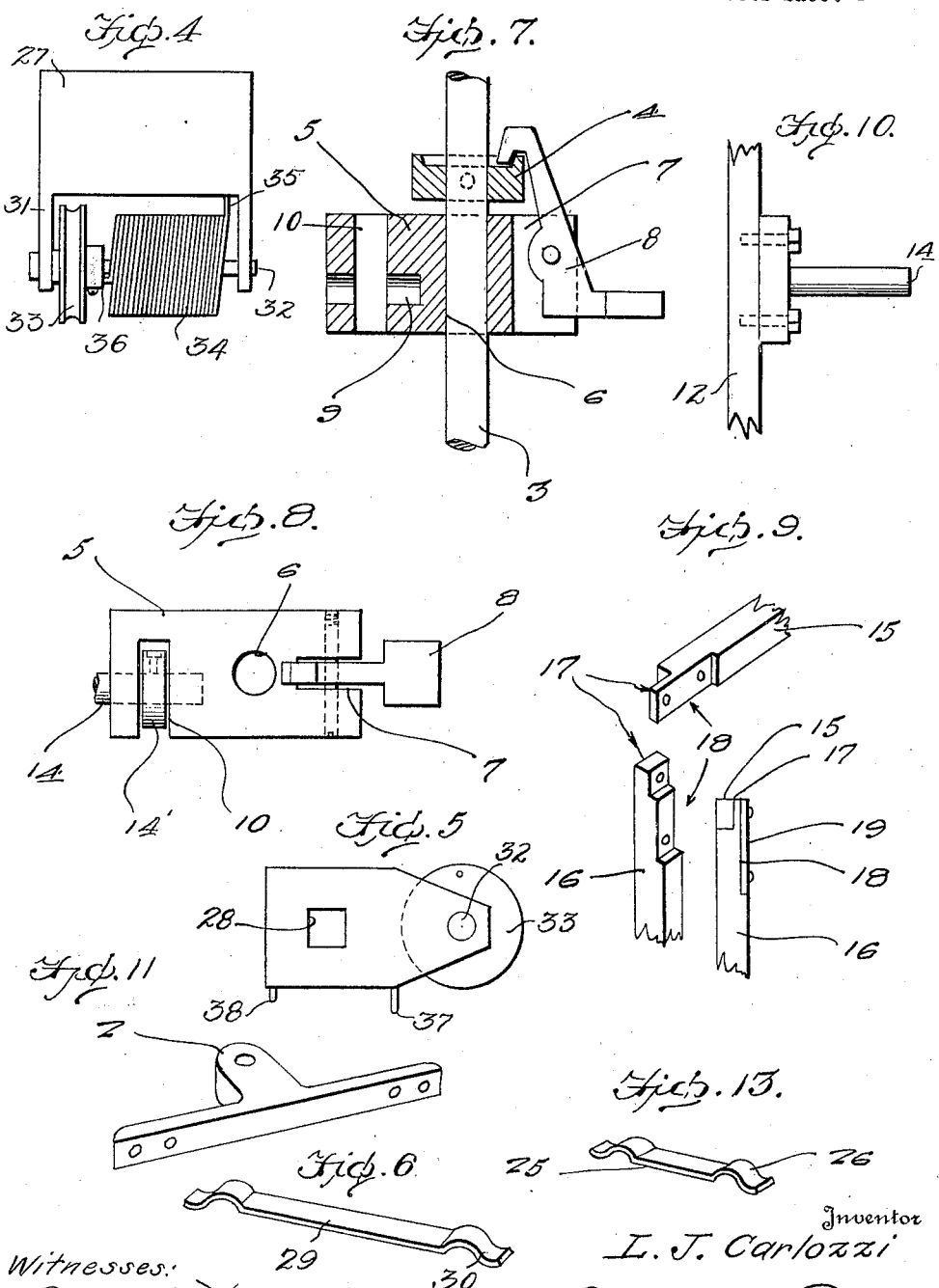

Patented Apr. 15, 1924.

1,490,659

UNITED STATES PATENT OFFICE.

LOUIS J. CARLOZZI, OF GAMBOA, CANAL ZONE.

DEVICE FOR USE IN DRAWING OBJECTS.

Application filed November 22, 1923. Serial No. 676,370.

*To all whom it may concern:*

Be it known that I, LOUIS J. CARLOZZI, citizen of the United States, residing at Gamboa, Canal Zone, have invented certain new and useful Improvements in Devices for Use in Drawing Objects, of which the following is a specification.

This invention relates to devices adapted for use in connection with drawings and the making of the same, and particularly to the means for viewing and determining the contour of an object which may be subsequently transferred to a sheet of paper for making the drawing of the object or for comparing a drawing previously made therewith.

An object of the invention is to provide a device of this character wherein a frame member is provided with a plurality of relatively movable strings adapted to be positioned on said frame to correspond with the lines of an object viewed therethrough so that the frame may be subsequently moved and laid on a drawing board above which it is mounted to facilitate the reproduction thereon of the lines of the objects viewed through the frame and produce an accurate scale drawing of the object.

Another object of the invention is to provide a device of this character having a frame provided with means for determining the relation between the object viewed therethrough and a drawing of the object on the drawing board above which the frame is mounted, and means cooperating with said fixing means for transferring the lines indicating the contour of the object onto the drawing board, so that an accurate scale drawing of an object in its true proportions may be made.

The invention comprehends other objects and improvements in the details of construction and arrangement of parts which are more particularly and clearly pointed out in detail in the following description and claims and shown in the accompanying drawings illustrating the preferred form of the invention, it being understood however, that slight variations in the construction and arrangement of the parts as shown may be made without departing from the spirit and scope of the invention as claimed.

In the drawings,

Figure 1 is a view in elevation of the invention showing the frame member in position for observing an object.

Figure 2 is a plan view thereof showing the frame in position on the drawing board for transferring the lines of the object observed.

Figure 3 is a diagrammatic plan view illustrating the method of using the device in making drawings of objects.

Figures 4 and 5 are detailed views showing respectively side and end elevations of the spring take up guides.

Figure 6 is a detail perspective view of one of the springs used in connection with the take up guide for holding said guide in adjusted position on the frame bars.

Figure 7 is a detail sectional view of the bearing blocks for the frame member secured in its upper position on the upright.

Figure 8 is a detail plan view of said bearing block.

Figure 9 is a detail perspective view showing in disassembled relation the manner in which the horizontal and vertical frame bars are connected together.

Figure 10 is a detail view of one of the bearing studs for the frame member.

Figure 11 is a detail perspective view of one of the brackets for securing the uprights to the drawing board.

Figure 12 is a detail perspective view of one of the string guides and the manner of mounting on the frame.

1 indicates a drawing board of any desired material of rectangular form and provided with bracket members 2 in which are removably mounted uprights 3 having collars 4 adjustably mounted thereon near the upper ends. Bearing blocks 5 are slidably mounted on the uprights 3 being provided in their central portions with openings 6 to receive the uprights, on their outer end portions with a bifurcated section 7, in which is pivotally mounted a catch 8 having a hooked end for engagement over the upper ends of collars 4 as clearly illustrated in Figure 7. Pintle receiving openings 9 are formed in the inner ends of these bearing blocks and recesses 10 extend transversely through the blocks near the inner ends thereof and the portion in which the pintle receiving openings are formed.

A rectangular frame member 11 is formed of outer and inner frame portions 12 and 13 respectively, of substantially quadrilateral shape and provided on the ends of the outer frame portion in the central portion thereof with bearing pintles 14 adapted for insertion and rotatable mounting in the bearing opening 9 of said bearing blocks, the ends of said pintles extending through the recesses 10 in said blocks and having collars 14′ removably secured thereto in said recesses, for establishing a rotatable connection between the frame and the blocks for preventing endwise movement of the frame therein, and also for preventing detachment of the frame therefrom.

The inner and outer frames 12 and 13 are similarly formed of horizontal and vertical rods 15 and 16 respectively provided at each end with dove-tails 17 and recessed front face portions 18 to provide for an interfitting connection between each of the bars of each frame, the recesses 18 being provided to receive corner plates 19 adapted to lie flush with the face of the bars and for connecting the inner and outer frames through the connecting portions 20 thereof.

A plurality of string guides 21 are slidably mounted on the inner and outer frames, in the present showing, there being two pairs of string guides on the longitudinal member 15 on the outer member 12, two pairs of string guides 21 on the vertical member 16 of the outer frame, and two of said string guides 21 on each of one of the vertical and horizontal rods of the inner frame members 13. These string guides are formed of blocks provided with rod receiving openings 22 extending through the central portion of the block and adapted to receive the rods of the frame, a diagonal hole 23 extending from one of the side faces to the adjacent bottom face and adapted for receiving and holding a string 24 and a spring member 25 having rod engaging portions 26 adapted to have the main portion contained within the opening 22 at the rod engaging portion 26 extending beyond said opening and said block for resiliently engaging the rod to hold the string member 21 in an adjusted position on its respective rod. Respective pairs of string guides 21 on the longitudinal and vertical rod members of the outer frame are connected by the strings 24 as clearly indicated in Figures 1 and 2 to form vertical and horizontal view gauging members adapted for determining the relative size of an object viewed through the frame, and its location with respect thereto with the drawing being made and compared on the drawing board.

Strings 24 connected at one end with the string guides 21 on their inner frame have the outer ends connected with string take up guides 27 slidably mounted on the opposite rod of the frame. The body portions of these take up guides 27 are formed with longitudinal rod receiving openings 28 also adapted to receive spring members 29 having resilient end portions 30 adapted for engagement with the rods passing through the openings 28 for frictionally holding the member 27 in an adjusted position on the rod. The front faces of these members 27 are provided with bearing extensions 31 at the ends thereof for rotatably mounting a shaft 32 having a spring take-up wheel 33 for receiving the string 24 mounted thereon, and a coil spring 34 having one end secured to the body of the member 27 as indicated at 35 and the other end removably connected with a hub portion formed on the take up wheel 33 as indicated at 36 for normally rotating the shaft and the take up wheel to apply tension on the spring 34. Guide loops 37 and 38 are secured to the outer faces of the member 27 for effectively guiding the string 24 to the wheels 33.

In the assemblage of the parts, the front faces of each part are secured in relative positions as clearly shown in Figure 1 and the springs 24 all extend from what may be termed the back faces of the block, so that when the frame is moved from the position shown in Figure 1 to that shown in Figure 2, the strings will be on the bottom of the frame and adapted for contacting with the upper surface of the board or drawing thereon. The take-up wheel 33 will extend forwardly of the frame, and the springs 25 and 29 will be positioned to the outer edges of the frame.

In using this device in the making of a drawing of an object, a sheet of drawing paper is tacked on the board 1 and the frame member 11 is turned to the position shown in Figure 1, from which the object to be drawn is viewed. Upon viewing this object through the frame, the outer string guide 21 with said strings 24 are slid horizontally and vertically respectively, until the object is viewed through the quadrilateral opening formed by these string members leaving a slight margin all around, the corners of said frame formed by the quadrilateral arrangement of the strings 24 being definitely determined with relation of some adjacent object, so that the arm may always be positioned in subsequent positioning of the frame in the same relation as when the strings are first cut. The frame is then swung on the pintles, and the latches 8 released from engagement with the collars 4 to permit the frame to be moved downwardly onto the drawing on the board 1, so that the points of crossing of the horizontal and vertical strings 24 carried by the outer frame member may be indicated on the drawings. The frame is then returned to the position shown in Figure 1, the strings carried by the outer frame always in the same relative position and the strings 24 on the inner frame are moved in accordance with the lines of the objects to be drawn on the paper, the inner section of the vertical and horizontal string members of the inner frames indicating the corners of the objects which may be located on the drawing by placing the frame thereon in the manner above described as shown in dotted lines in Figure 3 at 39. These string members 24 on the inner frame by means of their resilient connections with the take up guides 27 may be moved to diagonal positions relative to the frame as indicated at Figure 1 for the purpose of getting the direction of the lines of the objects which are either vertical, horizontal, or at an angle thereto, so that the drawing 40 indicated as partly finished in Figure 3 may be made from the object in exact proportion therewith. The drawing may be made, however, by the use of only one of the horizontal and one of the vertical strings on the inner frame, as any angle or points of an object viewed thru the frame may be determined by these two strings. The additional string members are provided to facilitate making a greater number of observations at one time.

This device is also adapted for use in connection with the comparing of drawings with the object from which they were made for determining whether the drawings are accurate in scale and proportions with the object. This is done by placing the drawing of the objects on the board 1 and fixing some point with the strings on the outer frame on the drawing relative to the same point on the object and fixing one of the lines on the drawing with relation to one of the lines on the object whereafter all of the lines on the drawings can be compared with the corresponding lines of the object.

It will be apparent from the foregoing description and the drawings that a simple and efficient construction has been provided for assisting the drawing of an object in its exact proportion as well as comparing drawings with the objects from which they were made.

What I claim as new is:

1. A device of the class described including a drawing board, an open frame member, means for slidably and pivotally supporting said open frame member on said board, and line determining members mounted in said open frame, said members being movable into positions determined by the lines of the objects to facilitate the reproduction of the lines of the objects upon the drawing board.

2. A device of the class described including a drawing board, a pair of uprights mounted on said drawing board and extending upwardly in parallel relation, bearing blocks slidable on the uprights, an open frame member pivotally mounted between said bearing blocks, position determining means carried by said frame and adjustable thereon for determining the relation between an object as viewed through the frame and a drawing thereof on the board, and line determining means adjustably supported on said frame adapted to be positioned to correspond with the lines of the object viewed through the frame.

3. A device of the class described including a drawing board, a pair of uprights mounted on the ends of said board in parallel relation, bearing blocks slidable on said uprights, an open frame member rotatable in said bearing blocks, a plurality of pairs of string guides slidably mounted on said open frame, a string carried by each pair of guides, certain of said strings being arranged in vertical relation, and other strings being arranged in a horizontal relation with respect to the frame, and means associated with certain of said string guides for permitting the strings carried thereby to be lengthened in a relative movement of one string guide with respect to the other of a pair carrying a string.

4. A device of the class described including a drawing board, a pair of uprights mounted thereon and extending in parallel relation, bearing blocks slidably mounted on said uprights, a frame member rotatable in said bearing blocks having outer and inner frame portions, arranged one within the other in spaced relation, string guides mounted on the outer frame and associated in pairs, strings connecting each guide of a pair, said strings being arranged on the outer frame in vertical and horizontal relation thereon for providing object position determining members, string guides arranged in pairs and slidable on the inner frame, string take-up members slidable on said inner frame and associated with certain of said string guides, strings connecting respective pairs of string guides on said inner frame, said strings being adapted for positioning in any angle within predetermined limits with respect to each other and the frame, said take-up members permitting a lengthening of the string upon the relative movement between the guides of a pair and at the same time holding said strings in tight relation upon said frame.

In testimony whereof I affix my signature.

LOUIS J. CARLOZZI.